INVENTORS: J. E. IWERSEN
J. T. NELSON
BY: H. W. Eckhart
ATTORNEY

April 10, 1962 J. E. IWERSEN ETAL 3,028,663

METHOD FOR APPLYING A GOLD-SILVER CONTACT ONTO SILICON AND GERMANIUM SEMICONDUCTORS AND ARTICLE

Filed Feb. 3, 1958 2 Sheets-Sheet 2

INVENTORS: J. E. IWERSEN
J. T. NELSON
BY: [signature]
ATTORNEY 3,028,663

METHOD FOR APPLYING A GOLD-SILVER CONTACT ONTO SILICON AND GERMANIUM SEMICONDUCTORS AND ARTICLE

John E. Iwersen, Morristown, and James T. Nelson, Gillette, N.J., assignors to Bell Telephone Laboratories, Incorporated, New York, N.Y., a corporation of New York Filed Feb. 3, 1958, Ser. No. 712,804
6 Claims. (Cl. 29—195)

This invention relates to semiconductive devices and, more particularly, to low resistance contacts to thin semiconductive regions and to methods for fabricating such contacts.

It is important in certain types of semiconductive devices to make contact to the semiconductive body in a manner which is advantageous both electrically and mechanically. This is particularly so in the case of devices having thin regions of alternate conductivity type, such as, for example, those produced wholly or in part by diffusion techniques as disclosed in the application of G. C. Dacey, C. A. Lee and W. Shockley, Serial No. 496,202, filed March 23, 1955, and C. S. Fuller and M. Tanenbaum, Serial No. 516,674, filed June 20, 1955, now Patent No. 2,861,018. In devices of this type it is a requisite to provide a contact having good conductivity from the underlying semiconductive material and, particularly, in devices having a relatively high power handling capability in relation to their physical size, the contact must have high lateral conductivity.

In the past it has been difficult to achieve these requisites and at the same time enable the facile assembly of the entire device by convenient methods. It has been found that gold is the most satisfactory metal from the standpoint of electrical conductivity and mechanical bonding for making electrodes on semiconductive material, such as germanium and silicon. However, when an ohmic electrode is fabricated on very thin diffused regions which, for example, may have a thickness of about .0001 inch, the deposition of a sufficiently heavy layer of gold to provide the desired high lateral conductivity results in an alloying of the gold and semiconductive material, thereby producing a molten region which penetrates the diffused region and, in effect, destroys the diffused junction structure. Some success has been achieved in applying the gold electrode in two distinct steps, permitting the assembly to cool after first depositing and alloying a very thin gold film and then reheating to a lower temperature than that previously used and depositing a final heavy layer of gold. This technique has resulted in generally poor structural contacts from the standpoint of the bond between the initial film and the heavier gold layer.

In order to overcome these and other disadvantages, a novel technique for applying an ohmic contact to a thin diffused region of germanium or silicon is provided by the applicants. This technique involves the use of a second metal immediately following the initial deposit of a metal film, which second metal provides an alloy system with the semiconductive material having a higher eutectic than that of the semiconductive material with the metal of the initial film. This enables a continuous deposition process without the necessity of lowering the temperature during the fabrication of the contact and further enables subsequent assembly operations to be accomplished on the device using the same metal as that used in the initial film for bonding operations at a temperature below that which would affect either the ohmic contact structure or diffused junctions within the semiconductive material.

It is therefore an object of this invention to produce improved electrical contacts to semiconductive bodies.

Another object is to facilitate the production of low resistance ohmic connections to thin conductivity type regions of semiconductors.

A further object of the present invention is to produce an ohmic connection to thin diffused regions of semiconductor devices which are stable to higher temperatures and form high conductivity and high mechanical strength connections.

These and other objects of the invention are achieved in one specific embodiment in a diffused junction silicon device of the type disclosed in the aforementioned application of Fuller and Tanenbaum, wherein the ohmic or low resistance connections to the thin diffused base region and an even thinner emitter region are provided in the form of rectangular stripes deposited on the top of the mesa structure of the device. These metallic electrodes are fabricated by the vacuum deposition through a perforated plate mask of first, a very thin film of gold containing a trace of a significant impurity, in this case antimony, to insure particularly the retention of the low resistance character of the base connection. This initial film typically is about 200 or 300 Angstroms thick and provides a quantity of gold sufficient to produce a good electrical and mechanical connection to the silicon but without the danger of having so large a quantity that alloying might occur through the diffused region.

Immediately following this initial deposition of gold, and without interrupting the evaporation process and thereby exposing the material to contamination, a comparatively heavy layer of silver is vacuum deposited through the same mask on top of the initial gold film. When the evaporation process is interrupted for a significant time it has been found that an intermediate layer of contamination forms which substantially degrades the mechanical structure. Typically, this silver layer may have a thickness of the order of five microns. This silver layer provides the high conductivity required for an ohmic contact in a device of the kind described. In general, the thickness of the silver is determined by the mass required to provide the desired lateral conductivity but without applying so great a quantity as to result in spreading beyond the limits of the initial gold film. Furthermore, the silver layer serves to bind together the gold film which has some tendency to segregate or "ball-up" when deposited in thin layers. However, it has been found important to use gold as the initial contact layer from both an electrical and mechanical standpoint with the silver layer bonding to the gold and providing a similar high conductivity. Furthermore, the silver-semiconductor eutectic is sufficiently high to enable the carrying out of subsequent gold-bonding operations without subjecting the structure to the possibility of alloying of the silver into the semiconductor substrate. For example, in the case of germanium, its eutectic with gold is about 356 degrees centigrade and with silver about 409 degrees centigrade. In the case of silicon, its eutectic with gold is about 377 degrees centigrade and with silver about 830 degrees centigrade.

The above-noted temperature differentials thus enable, in the case of both systems, the accomplishment of the entire vacuum deposition of the metallic contact structure at a temperature slightly above the gold-semiconductor eutectic and below the silver-semiconductor eutectic, thus avoiding the danger of producing an alloy region entirely through the thin diffused region and without the necessity of interrupting the evaporation process with consequent possible contamination. Furthermore, subsequent fabrication operations using gold bonds may be accomplished without the risk of degrading the ohmic contact or adjacent diffused regions.

One feature of the invention, therefore, resides in initially plating a very thin film of a lower eutectic point metal with the semiconductor to provide the desired intimate electrical and mechanical bond. Another feature is the subsequent deposition of a second metal having a higher eutectic point with the semiconductor over the initial film without interruption of the evaporation process.

Additionally, in structures of the diffused junction type, the compression bonding techniques, such as are disclosed in the applications of O. L. Anderson and H. C. Christensen, Serial No. 619,639, filed October 31, 1956, and O. L. Anderson, P. Andreatch, Jr., and H. C. Christensen, Serial No. 647,886, filed March 22, 1957, have been found most advantageous for the attachment of wire leads to plated electrodes. In the use of such bonds it has been found desirable to use a gold layer as a substrate. It is, therefore, a further feature of this invention to apply, conveniently by vacuum deposition, a final layer of gold on top of the silver layer, described above, to facilitate the making of compression bonds to the plated electrode.

More specifically, it is a feature of this invention to employ alternate layers of gold and silver comprising an initial very thin layer of gold, followed successively by relatively heavier layers of silver and gold, to produce ohmic or low resistance contact electrodes for semiconductor devices having thin diffused conductivity-type regions.

The invention and its additional objects and features will be understood more clearly and fully from the following description considered in conjunction with the accompanying drawing in which.

Figure 4:
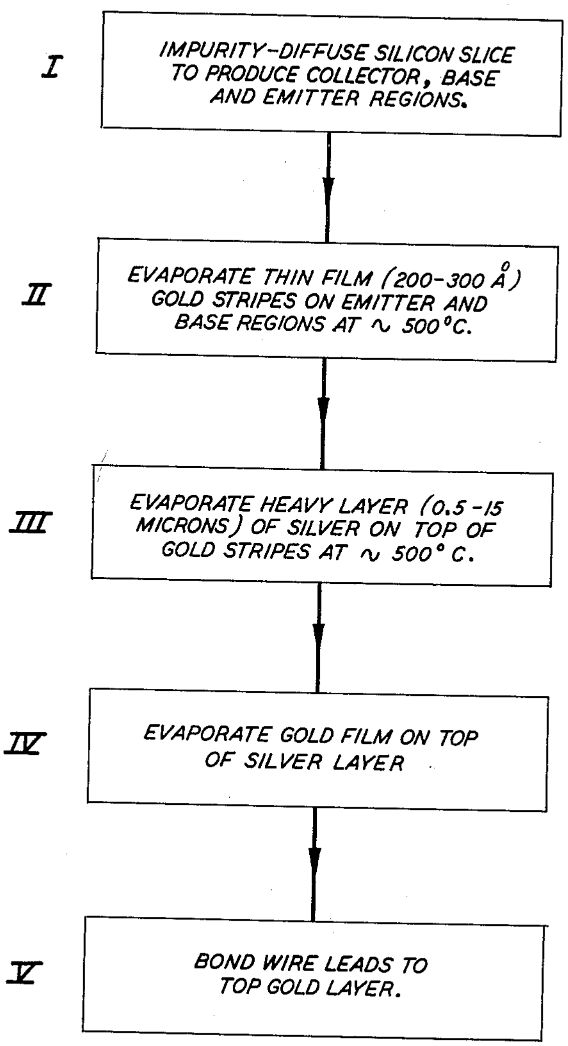
FIG. 4 shows in the form of a block diagram flow chart the basic steps of the method of this invention.

Referring to the drawing, FIG. 4 sets forth in the form of a flow chart the fabrication steps associated with one method of this invention. Typically, the diffused junction devices to which this method is particularly applicable are fabricated from relatively large thin slices of monocrystalline semiconductive material, such as germanium and silicon. Such a slice may represent a cross-section of a single crystal and have a thickness of about 10 to 20 mils. In this disclosure use will be made of the terms "mils" and "microns" as measurements of length, it being understood that one mil is .001 inch and equal to about 25.4 microns. The above-described slice may be approximately circular and have a radius of about .50 inch.

The semiconductor slice, of near intrinsic P-type material having a hole concentration of about $5\times10^{14}$ per cubic centimeter, is first mechanically polished using Linde A abrasive and is then subjected to a solid state diffusion process using boron as the significant impurity to produce P-type conductivity layers having a carrier concentration of about $10^{20}$ per cubic centimeter to a depth of about 1.6 mils from both faces of the slice. The slice is then lapped and polished mechanically on both faces. On one face from 0.2 to 0.4 mil of the surface material which contains a high concentration of boron is removed to avoid uncontrolled rediffusion of boron in subsequent diffusion steps. A much greater amount of material is removed from the opposite face of the slice so as to leave a layer of about one mil thickness of the original near intrinsic material contiguous with the layer of boron diffused material, leaving the slice with a total thickness of 2.5 mils or thereabouts. The slice is again subjected to a solid state diffusion treatment using antimony as the significant impurity to produce an N-type base region by converting a portion of the near intrinsic region to a depth of about 0.2 mil. Because of the relative concentrations used, the antimony does not materially affect the conductivity type of the boron diffused layer on the opposite face. The electron concentration of the antimony diffused N-type conductivity region is about $10^{18}$ per cubic centimeter.

The final diffusion step comprises producing a P-type emitter layer in the form of a rectangular stripe approximately $5\times60$ mils in area and having a depth of about .12 mil. In the particular semiconductor device herein described, the limitation on the depth of the emitter layer is determined by the requirement of a spacing of .06 mil between the emitter-to-base junction and the base-to-collector junction. These diffused emitter regions are formed at spaced intervals on the N-type face of the slice by depositing boron oxide through a mask or otherwise restricting the deposition to the limited area of the emitter region, and subsequently heating at diffusion temperatures to cause the boron to diffuse into the silicon substrate from the oxide layer. The carrier concentration of the P-type emitter regions is about the same as the concentration in the P-type collector region.

Thus, as a result of the fabrication procedure represented by block I, FIG. 4, a slice of silicon is produced having a P-type layer on the bottom surface, an intermediate intrinsic layer and an N-type base layer on the upper surface interspersed with restricted area P-type emitter regions at uniform intervals on the upper surface.

Figure 1:
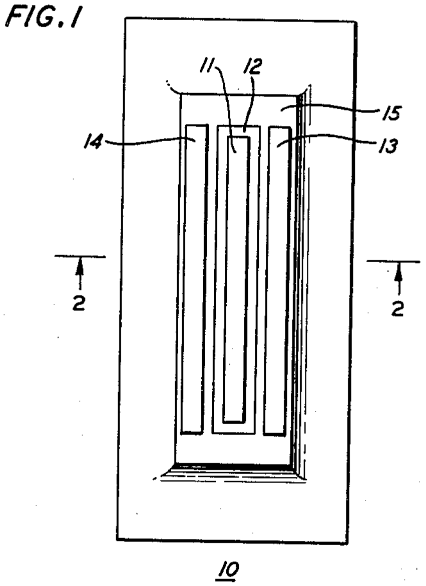
FIG. 1 is a schematic plan view of a diffused junction semiconductor device having contact electrodes in accordance with this invention.

As indicated by the block II of FIG. 4, formation of the initial metal layer for the ohmic electrode connection to the emitter and base regions is the next step in the fabrication of these devices. A mask similar to the type of mask used in connection with the diffusion of the emitter region, but having perforations or slots so as to enable deposition therethrough of three close spaced parallel stripes, is positioned in close proximity to the face of the slice having the multiple diffused emitter regions. As best seen in FIG. 1, the mask enables the formation of an electrode 11 slightly smaller than and concentric with the emitter region 12. In this particular transistor the base resistance is lowered by provision of two base electrode stripes 13 and 14, one on each side of the emitter region. This results in a substantial improvement in the power gain of the device. With the perforated mask in place on the surface of the slice, the assembly is enclosed in a vacuum chamber with heater-type filaments, one loaded with gold containing 0.1 percent antimony and another loaded with silver. The chamber is evacuated to a pressure of about $2\times10^{-5}$ millimeters of mercury and the slice is raised to a temperature of about 500 degrees centigrade. The filament carrying the gold is energized and sufficient gold is evaporated to produce a layer of between 100 and 300 Angstroms thickness. The factors determining the thickness of the gold film relate to the avoidance of a coating so light as to be ineffective as a mechanical and electrical bond or so heavy as to permit formation of an alloy region through the diffused layer. Under some conditions a film as thin as 20 Angstroms or as thick as 2,000 Angstroms may be desirable. A layer of about 200 Angstroms thickness of gold is readily determined by observing the moment at which the film becomes opaque, as observed through a microscope slide positioned in the vacuum chamber with the slice. Typically, this film should be deposited in about one minute.

As soon as the desired thickness of gold film is approached, the silver-loaded filament is energized. When an appreciable flow of silver is observed the gold-loaded filament may be turned off. It is generally advantageous for optimum results that the deposition process be continuous with no interruption in the flow of metal vapor. Sufficient silver is evaporated to provide a layer of about five microns thickness. As indicated hereinbefore, the thickness of the silver layer may vary depending upon the electrical characteristics of the device and the requirement for stopping the pile-up of silver before it spreads beyond the area of the initial gold film. It appears that as little as about 0.5 micron thickness of silver achieves the purpose of preventing alloying of an outer gold layer therethrough and into the silicon. On the other hand, certain applications may require a layer of silver as heavy as 15 microns to provide the requisite high lateral conductivity. The thickness is readily controlled by providing a limited amount of silver sufficient to produce such a coating and evaporating it entirely. When all, or nearly all, of the silver has been evaporated, the gold-loaded filament is reenergized and a final layer or coating of gold is applied on top of the silver. These steps are set forth by the blocks marked III and IV of FIG. 4. In some applications it will be found advantageous after the initial gold deposition to evaporate the silver and gold simultaneously. Because of the higher evaporation rate of silver, it will deposit much more rapidly than the gold and by properly proportioning the amount of the two metals loaded on the filaments, there will be deposited a middle layer predominately of silver with an outer coating of gold. It will be apparent that under certain circumstances more than two heater filaments might be provided for controllably depositing the gold and silver layers.

Figure 2:
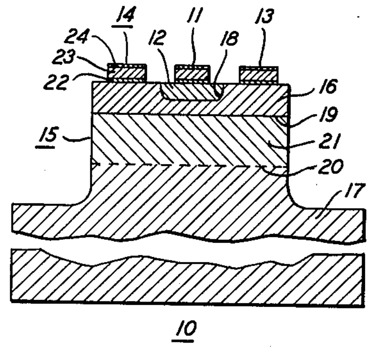
FIG. 2 is a cross-section of the device of FIG. 1.

After completion of the evaporation steps, the assembly is removed from the vacuum chamber and the slice is divided into a plurality of separate wafers of about 100×45 mils size, each having the electrodes and diffused emitter region centrally disposed on one face thereof, as illustrated in FIGS. 1 and 2.

Considering the fabrication in terms of a single wafer from this point, a mesa portion 15 is produced by etching away portions of the wafer 10, as disclosed in the aforementioned applications of Dacey-Lee-Shockley and Fuller-Tanenbaum. Atop the mesa portion 15 are the emitter electrode 11 and base electrodes 13 and 14. As shown in FIG. 2, the semiconductive wafer comprises the P-type emitter region 12, the N-type base region 16 defined by the PN junctions 18 and 19, and the collector region 17. The broken line 20 indicates the region of transition from the original near intrinsic portion 21 to the higher conductivity P-type collector region 17. The change from the one region to the other is gradual.

As indicated hereinabove, the diffused layers shown in the cross-section of FIG. 2 are of extreme thinness. The collector region 17, which is shown broken with a portion omitted to enable use of a larger scale, may have a thickness of about 1.6 mils. The near intrinsic layer 21 has a thickness of about 0.4 mil and the base region 16 is about 0.2 mil or less in thickness. The boron-diffused emitter region 12 penetrates into the base region 16 to a depth of about .12 mil.

Figure 3:
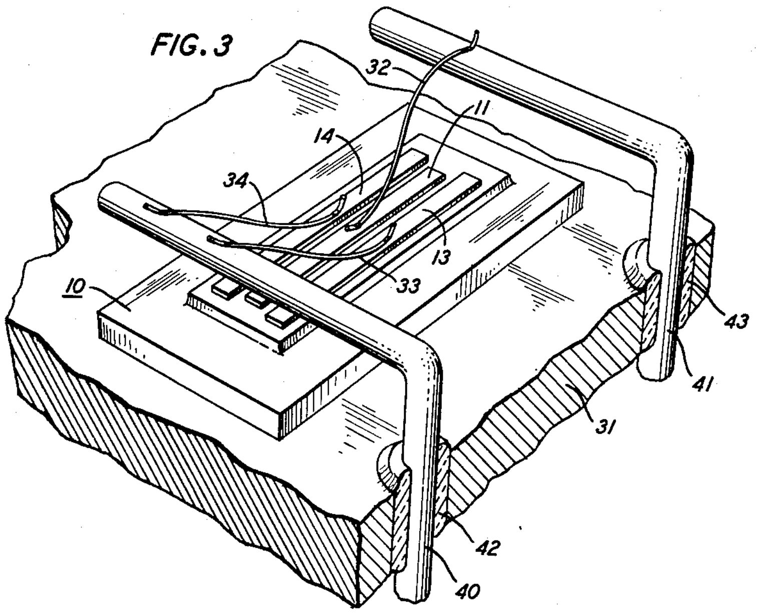
FIG. 3 is a partial view in perspective of one type of diffused junction semiconductor device including the contact electrodes in accordance with this invention and showing a typical lead structure.

It is apparent that the thin emitter and base regions of the foregoing described structure present difficulties in making low resistance connections thereto. As depicted in schematic form and not to scale, the electrode structures in accordance with this invention may be regarded as multilayer elements. Considering the base electrode 14, it comprises the initial film 22 of gold. This film 22 will be alloyed, to some extent at least, with the underlying semiconductive material and, having a thickness of perhaps 200 Angstroms, would be virtually indistinguishable when viewed in section even with high magnification. The next and heaviest layer 23 is of silver, providing the major portion of the metallic electrode. As suggested hereinbefore, an outer layer 24, again of gold, advantageously is provided to facilitate attaching compression bonded wire leads. Upon completion of mesa etching, the semiconductive wafer is further processed in accordance with cleaning and etching techniques well known in the art. Referring to the partial view of FIG. 3, the wafer 10 is mounted on a mounting platform or header 31, preferably by gold bonding which may be accomplished faciley at a temperature of about 400 degrees centigrade without danger of affecting the wafer structure.

Wire leads are attached to the base and emitter electrodes by compression bonding to the gold surfaces of the electrodes. Advantageously, such wire leads may be gold. Two of the leads 33 and 34 are attached to one stem member 40 which functions as the base connection for the transistor, while the lead 32 to the middle emitter electrode 11 is attached to another stem 41 to provide the emitter connection. The mounting platform or header 31 functions as the collector electrode and may comprise the metallic shell or housing of the transistor. The stem members 40 and 41 are insulated from the header by glass inserts 42 and 43.

The particular advantages of the contact structure in accordance with this invention will be appreciated from the fact that a device of the configuration described above has been constructed having a capability of delivering five watts power at a frequency of 10 megacycles per second at a relatively high efficiency. At a frequency of 100 megacycles per second the device is still capable of delivering one watt power at about 15 percent efficiency. The efficacy of the ohmic electrodes produced in accordance with this invention in providing a highly satisfactory low resistance and high current carrying capacity is apparent from the foregoing figures.

Substantially the same fabrication technique is employed for the making of similar contact electrodes on germanium with the difference that a lower temperature of between 390 and 400 degrees centigrade is advantageously used.

While specific embodiments of the invention have been disclosed herein, it will be understood that variations may be devised by those skilled in the art which are within the scope and spirit of the invention.

What is claimed is:

1. An element for integration with a semiconductive body selected from the group consisting of silicon and germanium by alloying to form a conductive connection thereto comprising a thin gold film bonded to said semiconductive body, a layer predominately of silver bonded to said gold film, and a third metallic conductive member bonded to said silver layer.

2. A substantially ohmic connection to a semiconductive body selected from the group consisting of silicon and germanium comprising a thin gold film of the order of 200 Angstroms thickness bonded to said semiconductive body, a layer predominately of silver having a thickness of from 0.5 to 15 microns bonded to said gold film, and a metallic conductive member bonded to said predominately silver layer.

3. A substantially ohmic connection to a semiconductive body selected from the group consisting of silicon and germanium comprising a thin gold film of the order of 200 Angstroms thickness bonded to said semiconductive body, a layer predominately of silver having a thickness of from 0.5 to 15 microns bonded to said gold film, and a layer substantially of gold bonded to said silver layer.

4. The method of making a low resistance connection to a semiconductive body selected from the group consisting of silicon and germanium, comprising vapor depositing a film of gold having a thickness in the range between 200 and 1,000 Angstroms and simultaneously bonding said film to said semiconductive material by heating to a temperature above the gold to semiconductor eutectic, and below the silver to semiconductor eutectic, continuously thereafter, vapor depositing on said gold film a layer predominately of silver having a thickness of from 0.5 to 15 microns.

5. The method of making a low resistance substantially ohmic connection to a silicon semiconductive body including therein thin diffused conductivity-type regions comprising the steps of continuously vapor depositing on discrete portions of said body first, a film of gold of a thickness of about 200 Angstroms, simultaneously alloy bonding said film to said silicon by maintaining a temperature of about 500 degrees centigrade, and second a heavier layer predominately of silver having a thickness of from 0.5 to 15 microns and maintaining the temperature at about 500 degrees centigrade.

6. The method of making a low resistance substantially ohmic connection to a germanium semiconductive body including thin diffused conductivity-type regions comprising the steps of continuously vapor depositing on discrete portions of said body first, a film of gold of a thickness of about 200 Angstroms, simultaneously alloy bonding said film to said silicon by maintaining a temperature of about 400 degrees centigrade, second, a heavier layer predominately of silver having a thickness of from 0.5 to 15 microns and maintaining the temperature at about 400 degrees centigrade.

References Cited in the file of this patent

UNITED STATES PATENTS

| | | |
|---|---|---|
| 2,446,254 | Van Amstel | Aug. 3, 1948 |
| 2,531,660 | Ziegler | Nov. 28, 1950 |
| 2,763,822 | Frola et al. | Sept. 18, 1956 |
| 2,782,492 | Frost | Feb. 26, 1957 |
| 2,793,420 | Johnston et al. | May 28, 1957 |
| 2,820,932 | Looney | Jan. 21, 1958 |
| 2,824,269 | Ohl | Feb. 18, 1958 |
| 2,922,092 | Gazzara et al. | Jan. 19, 1960 |

OTHER REFERENCES

Kelly: "Pressure Welding," The Welding Journal, August 1951, pages 728–736.